US010429259B2

(12) United States Patent
Riethmueller et al.

(10) Patent No.: US 10,429,259 B2
(45) Date of Patent: Oct. 1, 2019

(54) PRESSURE SENSOR FOR MEASURING A PRESSURE OF A FLUID MEDIUM

(71) Applicant: Robert Bosch GmbH, Stuttgart (DE)

(72) Inventors: Bernd Riethmueller, Stuttgart (DE); Hartmut Stetter, Ostfildern-Nellingen (DE); Markus Reinhard, Kornwestheim (DE); Masoud Habibi, Schwieberdingen (DE); Michael Bachner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 15/517,770

(22) PCT Filed: Sep. 2, 2015

(86) PCT No.: PCT/EP2015/070002
§ 371 (c)(1),
(2) Date: Apr. 7, 2017

(87) PCT Pub. No.: WO2016/058743
PCT Pub. Date: Apr. 21, 2016

(65) Prior Publication Data
US 2017/0315009 A1    Nov. 2, 2017

(30) Foreign Application Priority Data
Oct. 16, 2014  (DE) .................. 10 2014 221 067

(51) Int. Cl.
*G01L 13/02*    (2006.01)
*G01L 19/14*    (2006.01)
(Continued)

(52) U.S. Cl.
CPC ............. *G01L 15/00* (2013.01); *G01L 13/00* (2013.01); *G01L 19/142* (2013.01); *G01L 23/24* (2013.01);
(Continued)

(58) Field of Classification Search
CPC ..... G01L 19/147; G01L 9/0042; G01L 19/04; G01L 9/0072; G01L 13/025;
(Continued)

(56) References Cited

U.S. PATENT DOCUMENTS 3,930,412 A    1/1976  Mallon et al.
8,770,034 B2   7/2014  Bentley et al.
(Continued)

FOREIGN PATENT DOCUMENTS

DE    2746105 A1    5/1978
DE    19711366 A1   9/1998
(Continued)

OTHER PUBLICATIONS

International Search Report dated Oct. 26, 2015, of the corresponding International Application PCT/EP2015/070002 filed Sep. 2, 2015.
(Continued)

*Primary Examiner* — Andre J Allen
(74) *Attorney, Agent, or Firm* — Norton Rose Fulbright US LLP; Gerard Messina

(57) ABSTRACT

A pressure sensor for measuring a pressure of a fluid medium in a measuring chamber is provided. The pressure sensor includes a sensor housing, a first pressure-sensor module for measuring at least one first pressure of the medium in a first measuring chamber, and a second pressure-sensor module for measuring at least one second pressure of the medium in a second measuring chamber. The first pressure-sensor module and the second pressure-sensor module are situated inside the sensor housing. In addition, the pressure sensor has at least one first pressure connection, which is designed for the connection to the first measuring chamber. Moreover, the pressure sensor has at least one second pressure connection, which is developed for the
(Continued)

connection to the second measuring chamber. The first pressure connection differs from the second pressure connection.

6 Claims, 4 Drawing Sheets

(51) Int. Cl.
*G01L 15/00* (2006.01)
*G01L 13/00* (2006.01)
*G01L 23/24* (2006.01)
*G01L 9/00* (2006.01)
*G01L 19/00* (2006.01)

(52) U.S. Cl.
CPC .... *G01L 9/0052* (2013.01); *G01L 2019/0053* (2013.01)

(58) Field of Classification Search
CPC . G01L 9/0054; G01L 9/0075; G01L 19/0038; G01L 19/0084; G01L 19/14; G01L 19/0069; G01L 19/0618; G01L 19/0645; G01L 9/0052; G01L 9/0055; G01L 9/0073; G01L 19/0092; G01L 19/143; G01L 9/0051; G01L 11/025; G01L 19/0046; G01L 19/06; G01L 19/0627; G01L 19/0681; G01L 9/00; G01L 9/0041; G01L 9/0044; G01L 11/04; G01L 19/0007; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/18; G01L 1/2262; G01L 1/2287; G01L 1/246; G01L 1/26; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16
USPC .................................................. 73/700–756
See application file for complete search history.

(56) References Cited

U.S. PATENT DOCUMENTS

| 9,784,633 | B2* | 10/2017 | Sgourakes | G01L 19/0015 |
| 2008/0034877 | A1* | 2/2008 | Fessele | G01L 19/069 73/700 |
| 2012/0304752 | A1* | 12/2012 | Krommenhoek | G01L 19/14 73/114.76 |
| 2013/0205907 | A1* | 8/2013 | Fukano | G01L 7/08 73/715 |
| 2013/0220029 | A1 | 8/2013 | Gardner et al. | |
| 2014/0033824 | A1* | 2/2014 | Habibi | G01L 9/0073 73/724 |
| 2016/0103034 | A1* | 4/2016 | Dutsky | G01L 19/143 73/756 |
| 2018/0209865 | A1* | 7/2018 | Reinhard | G01L 13/025 |

FOREIGN PATENT DOCUMENTS

| DE | 19750131 A1 | 6/1999 |
| DE | 69715928 T2 | 8/2003 |
| DE | 102009026676 A1 | 12/2010 |
| DE | 102009027132 A1 | 12/2010 |
| DE | 102011085055 A1 | 4/2013 |
| DE | 102012218214 A1 | 4/2014 |
| EP | 1521952 A1 | 4/2005 |
| WO | 9939171 A1 | 8/1999 |

OTHER PUBLICATIONS

Konrad Reif (Publ.): Sensoren im Kraftfahrzeug [Automotive Sensors], 1st ed. 2010, pp. 80-82 and 134-137.

* cited by examiner

PRESSURE SENSOR FOR MEASURING A PRESSURE OF A FLUID MEDIUM

BACKGROUND INFORMATION

Various devices and methods for measuring pressures of fluid media such as gases and liquids are available in the related art. The measuring variable pressure is a nondirectional force that occurs in gases and liquids and acts in all directions. Dynamically and statically acting measuring-value pickups or sensor elements are available for measuring the pressures. Dynamically acting pressure sensors are used only for measuring pressure pulsations in gaseous or liquid media. The pressure measurement may be carried out directly, via a diaphragm deformation, or with the aid of a force sensor.

In particular when measuring very high pressures, it would be sufficient simply to expose an electrical resistor to the medium inasmuch as all known resistors exhibit a pressure dependency to a lesser or greater degree. However, the suppression of the simultaneous dependency of the resistors from the temperature and the pressure-tight feeding of their electrical connections out of the pressure medium causes difficulties.

Therefore, the most common method used for measuring pressures first utilizes a thin diaphragm as the mechanical intermediate stage for the signal measurement, which is exposed to the pressure on one side and deforms to a greater or lesser degree under its influence. Within broad limits, its thickness and diameter are able to be adapted to the particular pressure range. Low pressure-measuring ranges lead to comparatively large diaphragms which may deform in the range of 0.1 mm to 1 mm. High pressures, on the other hand, require thicker diaphragms of a small diameter, which frequently deflect only a few micrometers. Such pressure sensors are known, for example, from Konrad Reif (Publisher): *Sensoren im Kraftfahrzeug* [Automotive Sensors], $1^{st}$ ed. 2010, pages 80-82 and 134-136.

German Patent Application No. DE 10 2011 085 055 A1 describes a temperature-measuring device for measuring a temperature of a streaming fluid medium, in which a pressure-sensor module may optionally be provided.

German Patent Application No. DE 2012 218 214 A1 describes a pressure sensor for measuring a pressure of a fluid medium, the sensor having a housing and a pressure connector. Two sensor elements that are independent of each other are situated inside the housing. A pressure supply may be implemented via the pressure connector through pressure-supply channels to the sensor elements that measure the applied pressure. In this way, a redundant pressure measurement is able to be ensured in a reliable manner, yet it is impossible to measure the pressure at different locations within the measuring chamber.

European Patent No. EP 1 521 952 B1 describes a device for a pressure measurement, which has a pressure-sensor module that allows for a differential-pressure measurement between two different housing chambers.

In an internal combustion engine, fuel is mixed with air and made to ignite. The chemical energy bound in the fuel is partially converted into mechanical work in the process. Frequently, the air required to combust the fuel is not simply aspirated but is introduced into the combustion chamber by a compressor. The compressor is able to be driven mechanically or driven by the combustion gas (exhaust gas) expelled by the engine (exhaust turbocharger). The fuel to air ratio must lie within a certain range on account of the flammability of the pollutants etc. that are produced during the combustion, and is therefore controlled or regulated as a function of the operating mode.

In order to catch the particle emissions produced in the diesel combustion, a diesel particle filter is installed downstream from the turbine, for instance because of the EU5 exhaust-gas standard. However, the particles accumulated in the diesel particle filter must be removed from the filter again. In other words, the diesel particle filter must be regenerated on a regular basis by increasing the exhaust-gas temperature in the diesel particle filter until the particles are combusted to ash. For the control of the regeneration intervals, a differential pressure sensor is generally installed upstream above the diesel particle filter, which allows for modeling of the loading of the diesel particle filter. Not only fresh air but also exhaust gas is recirculated to the engine in order to reduce the nitrogen oxide emissions. The share of recirculated exhaust gas in the entire intake mass flow, i.e., the recirculation rate, is usually varied as a function of the operating point, e.g., the engine speed, load, temperature, etc. The exhaust gas recirculation may take place directly from the outlet to the intake in the form of a high-pressure exhaust-gas recirculation of the engine, or from a point downstream from the turbine and the diesel particle filter to a point upstream from the compressor in the form of a low-pressure exhaust-gas recirculation. To protect the compressor from damage caused by particles, a diesel particle filter must be installed upstream from a branch-off of a low-pressure exhaust recirculation system. While the high-pressure exhaust recirculation has been established for a long time in diesel engines, the low-pressure exhaust recirculation is a relatively new approach for satisfying future exhaust regulations. The regulation of the low-pressure exhaust recirculation mass flow or the low-pressure exhaust recirculation rate is therefore of decisive importance. In addition to the fresh air mass flow, the low-pressure exhaust-recirculation mass flow is required in order to calculate the low-pressure exhaust recirculation rate. In passenger cars, the fresh air mass flow is generally measured with the aid of a sensor, e.g., an air-mass meter or a hot-film air-mass meter. The low-pressure exhaust recirculation mass flow is normally estimated via a differential pressure sensor over the low-pressure exhaust recirculation section, i.e., between the low-pressure branch-off downstream from the diesel particle filter and the low-pressure mixing location upstream from the compressor. The low-pressure exhaust recirculation section is modeled as a throttle.

Despite the improvements brought about by these pressure sensors, there is still potential for optimizing conventional pressure sensors. For example, a measurement of a differential pressure via the diesel particle filter and the differential pressure via the low-pressure exhaust recirculation line at present requires two separate pressure sensors, each having its own voltage supply and its own supply hoses.

SUMMARY

In accordance with the present invention, a pressure sensor for measuring a pressure in a fluid medium is provided which may avoid the disadvantages of conventional pressure sensors at least for the most part and which in particular reduces the component expense, the outlay for the line connections to the exhaust-gas system, and the number of lines to the control unit.

An example pressure sensor according to the present invention for measuring a pressure in a fluid medium in a measuring chamber includes a sensor housing, a first pressure-sensor module for measuring at least one first pressure of the medium in a first measuring chamber, and a second pressure-sensor module for measuring at least one second pressure of the medium in a second measuring chamber. The first pressure-sensor module and the second pressure-sensor module are situated inside the sensor housing. In addition, the pressure sensor has at least one first pressure connection, which is developed to be connected to the first measuring chamber. Moreover, the pressure sensor has at least one second pressure connection, which is developed to be connected to the second measuring chamber. The first pressure connection differs from the second pressure connection.

In accordance with the present invention, the first measuring chamber may differ from the second measuring chamber in terms of its position and/or the amount of the pressure prevailing therein. For example, the difference may be realized in that the first measuring chamber is developed separately from the second measuring chamber, in particular spatially separate. Nevertheless, the first measuring chamber and the second measuring chamber may be connected to each other so that an exchange of the fluid medium from the first measuring chamber into the second measuring chamber and vice versa is possible.

Within the scope of the present invention, the first pressure connection differs from the second pressure connection. In other words, the first pressure connection and the second pressure connection are two separate or different components. The first pressure connection includes a supply channel for the supply of the fluid medium to the first pressure-sensor module. The second pressure connection likewise has a supply channel for the supply of the fluid medium to the second pressure-sensor module. Since the first pressure connection and the second pressure connection are two different components, a supply of the fluid medium by the first pressure connection to the first pressure-sensor module takes place independently of a supply of the fluid medium to the second pressure-sensor module.

The first pressure-sensor module and the second pressure-sensor module are separated from each other. The second pressure-sensor module may be developed to measure a third pressure of the medium in a third measuring chamber. In addition, the pressure sensor may have a third pressure connection, which is developed to be connected to the third measuring chamber. The third pressure connection may differ from the first pressure connection and from the second pressure connection. Within the scope of the present invention, the third measuring chamber may differ from the first measuring chamber and/or from the second measuring chamber in terms of its position and/or the amount of pressure prevailing therein. For example, the difference may be realized in that the third measuring chamber is developed separately, in particular physically separate from the first measuring chamber and/or the second measuring chamber. Nevertheless, the third measuring chamber and the first measuring chamber and/or the second measuring chamber may be connected to one another so that an exchange of the fluid medium from the first measuring chamber into the second measuring chamber and/or the third measuring chamber and vice versa is possible.

The first pressure-sensor module may measure an absolute pressure of the medium. As an alternative, the first pressure-sensor module may measure the second pressure of the medium. Accordingly, the second pressure is able to be measured by the first pressure-sensor module and/or the second pressure-sensor module. The first pressure-sensor module may be designed to measure a first differential pressure between the first pressure and the second pressure.

The second pressure-sensor module may be developed to measure a second differential pressure between the second pressure and the third pressure. The sensor housing may have a first housing chamber in which the first pressure prevails, a second housing chamber in which the second pressure prevails, and a third housing chamber in which the third pressure prevails. The first housing chamber, the second housing chamber, and the third housing chamber may be separated from one another. The first pressure-sensor module and the second pressure-sensor module may be disposed in two different levels on top of each other. The two levels may be situated in parallel with each other. For example, the first pressure-sensor module and the second pressure-sensor module may be stacked on top of each other. As an alternative, the first pressure-sensor module and the second pressure-sensor module are situated next to each other in the sensor housing.

Within the scope of the present invention, a pressure-sensor module is to be understood as a component that supplies the actual measuring signals with regard to the pressure and/or the measured values that are utilized for measuring the pressure of the fluid medium. For example, the pressure-sensor module may include a pressure-sensor element in the form of a sensor diaphragm which is developed as a measuring bridge, the sensor diaphragm having one or multiple piezo-resistive element(s) and/or other types of sensitive elements as is common in pressure sensors. For this purpose, the pressure-sensor module is connected to an evaluation and/or a control circuit, which may be situated on a circuit board. For additional possible developments of such pressure-sensor elements, reference may be made to the above-cited related art, in particular to Konrad Reif (Publ.): Sensoren im Kraftfahrzeug [*Automotive Sensors*], 1$^{st}$ ed. 2010, pages 80-82 and 134-136. However, other developments are basically possible as well.

An evaluation and/or a control circuit within the scope of the present invention are/is to be understood as a component that is suitable for processing signals. For example, the evaluation or control circuit may be an application-specific integrated circuit (ASIC). Such a circuit is an electronic circuit which is realized as an integrated switching circuit.

Within the scope of the present invention, a circuit carrier is to be understood as any component that is suitable for carrying a circuit. For example, the circuit carrier is developed as a circuit board. A circuit board within the scope of the present invention is a support for electronic components, which is used for the mechanical attachment of the electrical connection. The circuit boards are made from an electrically insulating material and have conductive connections, known as circuit traces, which adhere to it.

The pressure sensor according to the present invention may be used for the diagnosis of particle filters or for measuring a counter-pressure, such as an exhaust-gas counter-pressure upstream from a turbocharger.

A pressure connection within the scope of the present invention is a component that is developed for being connected to a measuring chamber. The pressure connection includes a connection element for the connection to the measuring chamber, which cooperates with a connection element of the measuring chamber. For example, the pressure connection has an external thread that engages with an internal thread of a wall of the measuring chamber. It is understood that a different type of connection element may also be provided such as a snap-in connection or a bayonet lock.

Within the scope of the present invention, the pressure connection may in particular be developed as a pressure connector. A connector within the framework of the present invention is a short, tubular connector piece. Since the connector protrudes into the fluid medium and the temperature is measured there, the connector is also referred to as measuring connector in the context of the present invention. Because the fluid medium normally has a pressure above the atmospheric or normal pressure and the connector must therefore exhibit a certain pressure resistance, the connector is also referred to as pressure connector, in particular in the case of combined pressure- and temperature-measuring devices. Such pressure connectors are likewise measuring connectors within the scope of the present invention.

In addition, the pressure sensor may include a temperature-sensing element for sensing a temperature of the fluid medium. A temperature-sensing element within the scope of the present invention refers to all types of known temperature sensors, in particular to what is known as NTCs, i.e., temperature-dependent electrical resistors having a negative temperature coefficient, whose electrical resistance varies with the temperature and in particular, drops as the temperature rises. However, PTCs are possible as well, i.e., electrical resistors having a positive temperature coefficient whose resistance increases as the temperature rises. As far as additional potential developments of such pressure sensors are concerned, reference may be made to the afore-described related art, in particular Reif (Publisher): *Sensoren im Kraftfahrzeug* [Automotive Sensors], $1^{st}$ ed. 2010, page 137. However, other developments are also possible in principle.

The pressure sensor according to the present invention is able to be used in the automotive field such as in the intake and exhaust-gas tract of an internal combustion engine, and in particular, in a diesel engine having exhaust-gas recirculation. Since the diesel particle filter and the low-pressure exhaust recirculation section lie in close proximity to each other and the position of the low-pressure exhaust recirculation branch-off is identical to the position downstream from the diesel particle filter, the two differential-pressure sensors are able to be combined in one housing. This combination has the potential to reduce costs for the sensors and the installation in the vehicle as well as the costs of the system in that the wiring and piping are reduced or simplified. The required installation space is reduced in addition. The sensor elements required for measuring the differential pressure are installed in a common housing such as in what is known as a back-to-back system or a similar system. Because both sensors are operated on the basis of a shared voltage supply and ground in this way, two pins on the sensor and two lines on the cable tree are saved in comparison with two separate sensors, which reduces the component expense, the required space and the complexity of the system. Because the low-pressure exhaust recirculation branch-off is identical to the position downstream from the diesel particle filter, a pressure connector, and thus also a pressure hose, are able to be omitted. A sensor having three pressure connectors and two differential-pressure measuring elements is able to be used for all applications where two differential pressures, e.g., $\Delta p_1 = p_1 - p_2$ and $\Delta p_2 = p_2 - p_3$, are required in series and a shared withdrawal point exists for $p_2$. Preferably, $p_1 > p_2 > p_3$ applies, but this is not mandatory. A multiple application of the principle is conceivable as well so that three or more differential pressures are measured in series. Additional pins and lines are able to be saved by utilizing a multi-channel interface, preferably the digital SENT (single edge nibble transmission) or PSI5 (peripheral sensor interface 5) interface.

The combination of two differential-pressure sensors in one housing saves two pins on the sensor and on the control unit side in each case; it also saves the corresponding lines because both sensor elements are operated using one voltage supply. In addition, a pressure connector including an associated linkage to the exhaust-gas system is able to be dispensed with because the low-pressure exhaust recirculation branch-off is identical to the position downstream from the diesel particle filter.

BRIEF DESCRIPTION OF THE DRAWINGS

Additional optional details and features of the present invention result from the following description of preferred exemplary embodiments, which are schematically illustrated in the figures.

DETAILED DESCRIPTION OF EXAMPLE EMBODIMENTS

Figure 1:
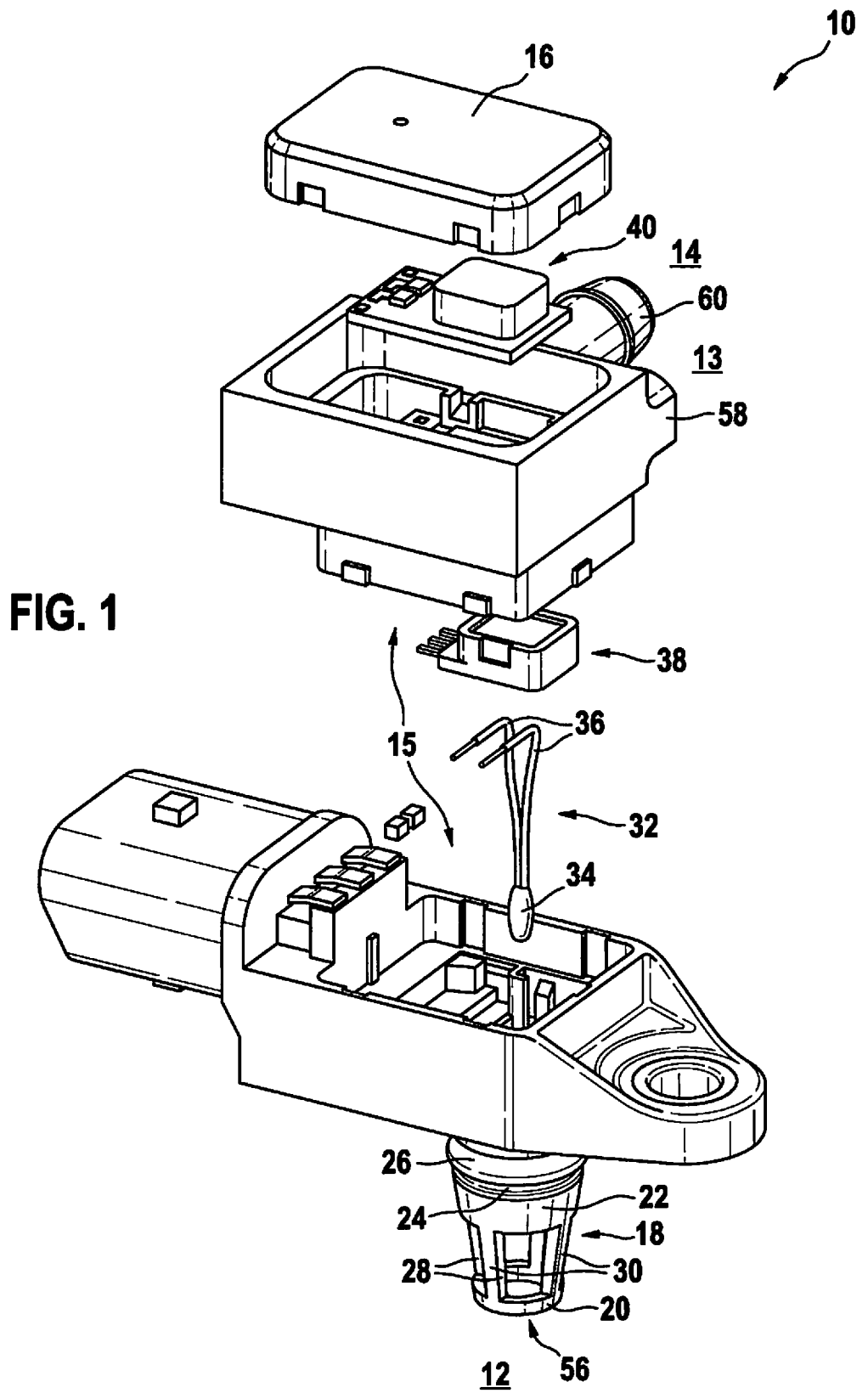
FIG. 1 shows an exploded view of a pressure sensor according to a first specific embodiment of the present invention.

FIG. 1 shows an exploded view of a pressure sensor 10 according to the present invention for measuring a pressure of a fluid medium. The pressure sensor may be a combined pressure-temperature sensor as described in greater detail in the following text. Because the present invention may be used in the automotive sector, in particular, pressure sensor 10 may be installed on different measuring chambers 12, 13, 14 of an internal combustion engine, in particular on a first measuring chamber 12, a second measuring chamber 13, and a third measuring chamber 14 such as an induction pipe, an exhaust-gas line, or an exhaust-gas recirculation line. Pressure sensor 10 has a sensor housing 15, which may be sealed by a housing cover 16. In addition, pressure sensor 10 may have a measuring connector 18, which may be a pressure connector. Measuring connector 18 may protrude into the fluid medium and be exposed to its stream. Measuring connector 18 has a lower end 20 and an upper end 22, which is situated closer to sensor housing 15 than lower end 20. A groove 24 for a sealing ring 26 such as an O-ring, by which sensor housing 15 is able to be sealed from measuring chamber 12, may be provided at upper end 22. Measuring connector 18 is in the form of a cage and has openings 28 through which the streaming fluid medium is able to flow into the interior of measuring connector 18. Openings 28 are at least partially bounded by posts 30.

As an option, a temperature-sensing element 32 may be accommodated in the interior of measuring connector 18. For example, temperature-sensing element 32 may be developed in the form of an NTC resistor. Temperature-sensing element 32 has a sensor head 34 in the form of a glass or plastic bead having two electrical connections 36 in the form of flexible legs. Measuring head 34, for example, is has a spherical shape and a diameter between 1 mm and 4 mm. As schematically illustrated in FIG. 1, temperature-sensing element 32 is able to be introduced from a side of sensor housing 15 that is pointing away from measuring connector 18. Accordingly, temperature-sensing element 32 is at least partially inserted into measuring connector 18.

A first pressure-sensor module 38 is located in the interior of sensor housing 15. First pressure-sensor module 38 is developed for measuring at least one first pressure of the fluid medium. In addition, a second pressure-sensor module 40 is situated in the interior of sensor housing 15. Second pressure-sensor module 40 is developed for measuring at least one second pressure of the fluid medium. In particular, first pressure-sensor module 38 and second pressure-sensor module 40 are situated on top of and separately from each other in sensor housing 15. Second pressure-sensor module 40 is furthermore developed for measuring a third pressure of the fluid medium. First pressure-sensor module 38 is developed for measuring an absolute pressure of the medium. As an alternative, first pressure-sensor module 38 may also be designed for measuring the second pressure of the medium. The first pressure, the second pressure, and/or the third pressure may differ from each other.

Figure 2:
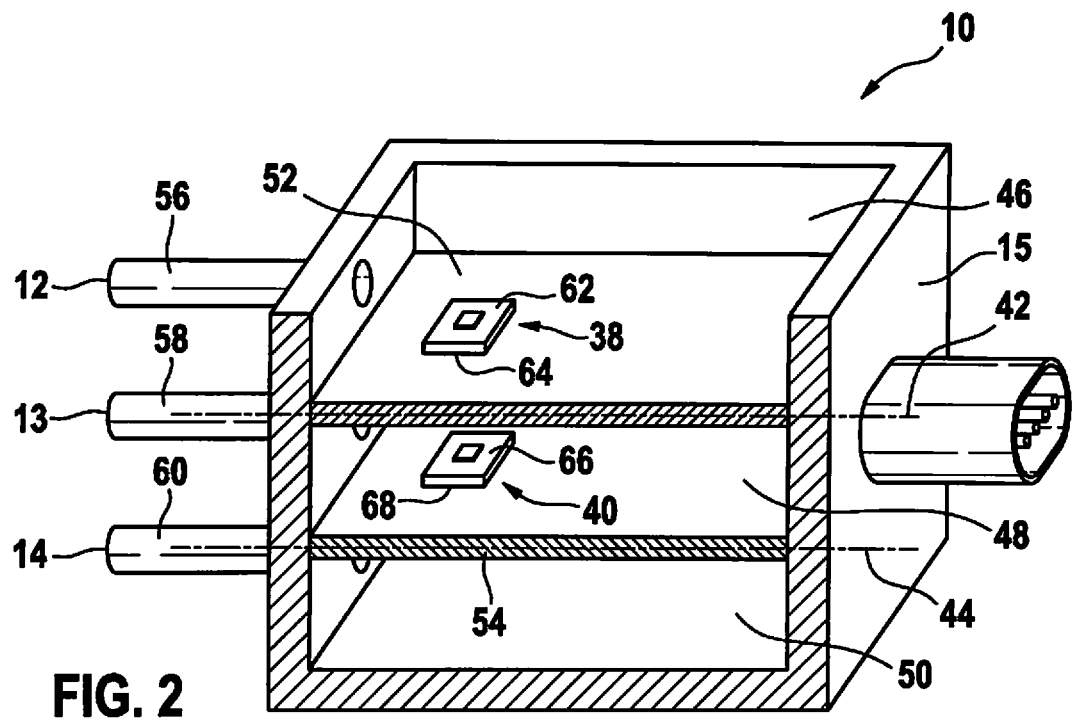
FIG. 2 shows a basic structure of the pressure sensor.

FIG. 2 illustrates a schematic structure of pressure sensor 10. Shown is the placement of first pressure-sensor module 38 and second pressure-sensor module 40 in the interior of sensor housing 15. First pressure-sensor module 38 and second pressure-sensor module 40 are situated in two different planes 42, 44 on top of each other in the interior of sensor housing 15. The two planes 42, 44 extend parallel to each other. First pressure-sensor module 38 and second pressure-sensor module 40 are disposed on top of each other in the form of a stack. Sensor housing 15 therefore has a first housing chamber 46 in which the first pressure prevails, a second housing chamber 48 in which the second pressure prevails, and a third housing chamber 50 in which the third pressure prevails. Separating walls 52, 54 separate first housing chamber 46, second housing chamber 48, and third housing chamber 50 from one another. Pressure sensor 10 has a first pressure connection 56, which is developed to be connected to first measuring chamber 12. To supply the fluid medium into first housing chamber 46, a supply channel, which is not shown in more detail and which allows the fluid medium to be conducted into first housing chamber 46, is developed in the interior of first pressure connection 56. For example, measuring connector 18 is developed as first pressure connection 56. In addition, pressure sensor 10 has a second pressure connection 58, which is to be connected to second measuring chamber 13. To supply the fluid medium into second housing chamber 48, a supply channel, which is not shown in greater detail, is developed in the interior of second pressure connection 58. In addition, pressure sensor 10 has a third pressure connection 60, which is developed to be connected to third measuring chamber 14. To supply the fluid medium to third housing chamber 50, a supply channel, which is not shown in greater detail, is developed in the interior of third pressure connection 60. The diameter of the supply channel of second pressure connection 58 may differ from the diameter of the supply channel of third pressure connection 60.

First pressure-sensor module 38 may measure a first differential pressure between the first pressure and the second pressure. For example, first pressure-sensor module 38 is situated in separating wall 52 in such a way that the first pressure in first housing chamber 46 is acting on a topside 62 of first pressure-sensor module 38, and the second pressure in second housing chamber 48 is acting on an underside 64 of first pressure-sensor module 38. Second pressure-sensor module 40 may be designed to measure a second differential pressure between the second pressure and the third pressure. For example, second pressure-sensor module 40 is situated in separating wall 54 in such a way that the second pressure in second housing chamber 48 is acting on a topside 66 of second pressure-sensor module 40, and the third pressure in third housing chamber 50 is acting on an underside 68 of second pressure-sensor module 40.

Figure 3:
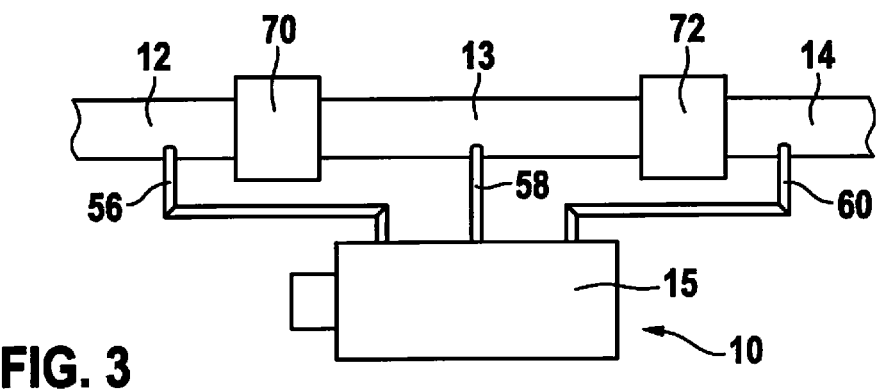
FIG. 3 shows a simplified illustration of a placement of the pressure sensor.

FIG. 3 shows a schematic system for the pressure measurement of pressure sensor 10. Pressure sensor 10 is able to measure the first pressure, the second pressure, and the third pressure of the fluid medium at different locations. In other words, first measuring chamber 12, second measuring chamber 13, and third measuring chamber 14 may spatially differ from one another. The first pressure, the second pressure, and the third pressure may differ due to installations between first measuring chamber 12, second measuring chamber 13, and third measuring chamber 14. For example, first pressure connection 56 and second pressure connection 58 are connected to first measuring chamber 12 and second measuring chamber 13 on different sides of a first component 70; second pressure connection 58 and third pressure connection 60 are connected to second measuring chamber 13 and third measuring chamber 14 on different sides of a second component 72. Accordingly, the first differential pressure may be a differential pressure over first component 70 and the second differential pressure may be a differential pressure over second component 72. First component 70 and/or second component 72 is/are filters, for example, through which the fluid medium is filtered. As an alternative, first component 70 and/or second component 72 is/are other components over which a pressure drop or a pressure increase takes place, such as throttles or compressors, for example.

Figure 4:
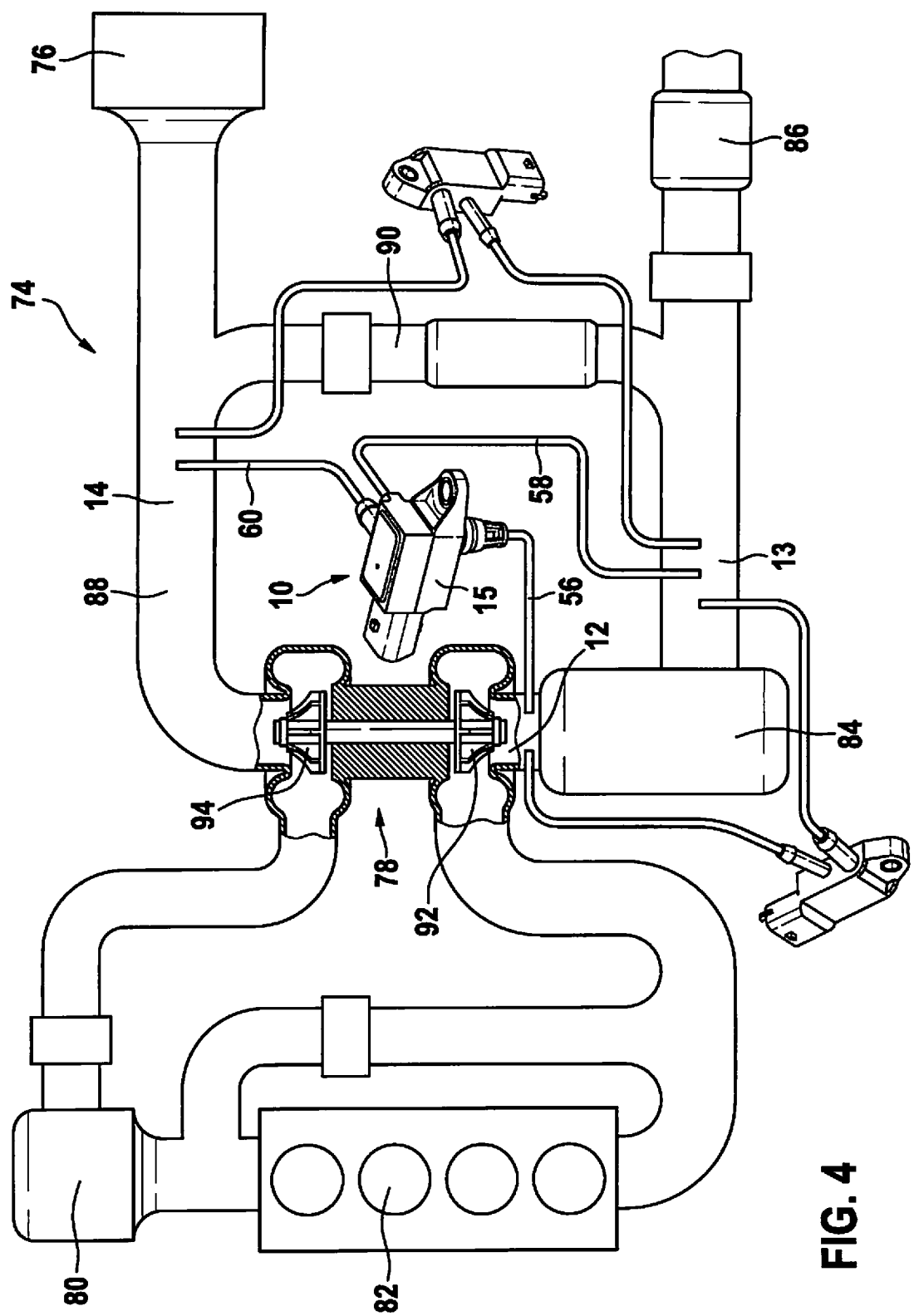
FIG. 4 shows a block diagram of an engine having the pressure sensor.

FIG. 4 shows a schematic placement of pressure sensor 10 in an engine 74 of an internal combustion engine. Engine 74 has an air filter 76, an exhaust-gas turbocharger 78, an intercooler 80, a combustion chamber 82, a particle filter 84 such as a diesel particle filter, and an exhaust 86. The mentioned components are connected via lines such as flow pipes 88, which form potential measuring chambers 12, 13, 14. In addition, engine 74 has an exhaust-gas recirculation line 90. For example, pressure sensor 10 may be connected via first pressure connector 56 to the first measuring chamber at a point between an exhaust-gas turbine 92 of exhaust-gas turbocharger 78 and particle filter 84. Second pressure connector 58 may be connected to second measuring chamber 13 at a point downstream from particle filter 84. This point is located approximately in the area of a withdrawal point of exhaust-gas recirculation line 90. Third pressure connector 60 may be connected to third measuring chamber 14 at a point upstream from a compressor 94 of exhaust-gas turbocharger 78. This point corresponds approximately to a feed-in point of exhaust-gas recirculation line 90. Since particle filter 84 and exhaust-gas recirculation line 90 are situated in close proximity to each other and the position of the withdrawal point of exhaust-gas recirculation line 90 is identical to the position downstream from particle filter 84, a pressure connector, and thus also a pressure hose, may be saved. Thus, two differential pressures that are normally required for all applications in the region of engine 74, are able to be measured with the aid of pressure sensor 10.

Figure 5:
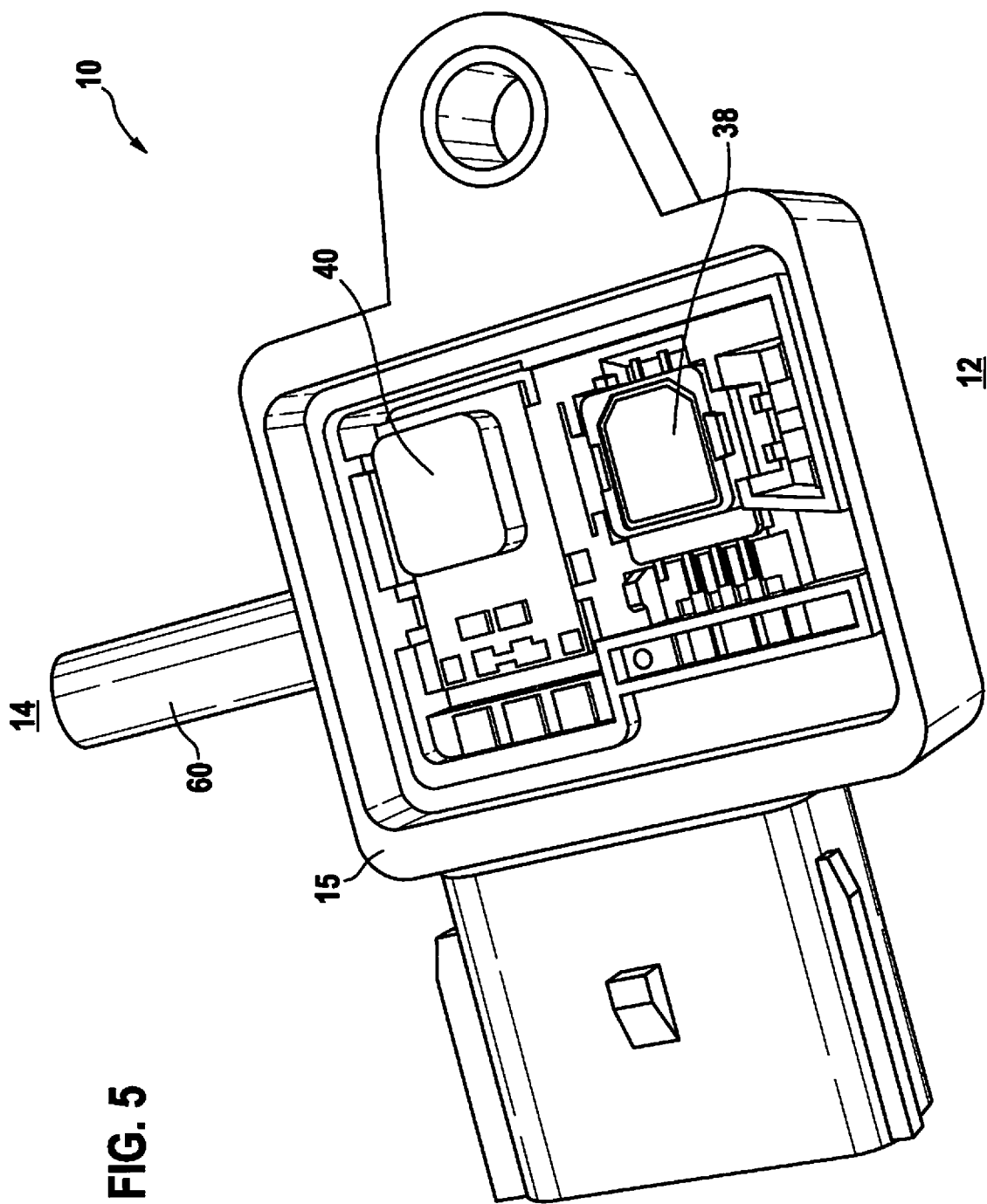
FIG. 5 shows a plan view of a pressure sensor according to a second specific embodiment of the present invention.

FIG. 5 shows a plan view of a pressure sensor 10 according to a second specific embodiment of the present invention. In the following text, only the differences from the first specific embodiment are described, and identical components have been provided with identical reference numerals. In pressure sensor 10 of the second specific embodiment, first pressure-sensor module 38 and second pressure-sensor module 40 are situated next to each other inside sensor housing 15. First pressure-sensor module 38 and second pressure-sensor module 40 may be situated in a common plane, which is not shown in greater detail. As an alternative, first pressure-sensor module 38 and second pressure-sensor module 40 are disposed at different height positions within sensor housing 15. The height position is a position that is defined on the basis of a dimension perpendicular to the drawing plane of the illustration of FIG. 5. A placement of first pressure-sensor module 38 and second pressure-sensor module 40 next to each other may make the assembly easier because the individual pressure-sensor modules provide easier access and require less space in terms of height.

What is claimed is:

1. A pressure sensor for measuring a pressure of a fluid medium in a measuring chamber, comprising:
   a sensor housing;
   a first pressure-sensor module for measuring at least one first pressure of the medium in a first measuring chamber; and
   a second pressure-sensor module for measuring at least one second pressure of the medium in a second measuring chamber, the first pressure-sensor module and the second pressure-sensor module being situated inside the sensor housing;
   at least one first pressure connection designed to be connected to the first measuring chamber; and
   at least one second pressure connection designed to be connected to the second measuring chamber, wherein the first pressure connection differs from the second pressure connection,
   wherein the second pressure-sensor module is designed to measure a third pressure of the medium in a third measuring chamber, and the pressure sensor further comprises:
   a third pressure connection designed to be connected to the third measuring chamber, wherein the third pressure connection differs from the first pressure connection and the second pressure connection,
   wherein each of the first pressure-sensor module and the second-pressure sensor module include a pressure sensor element in the form of a sensor diaphragm developed as a measuring bridge having at least one piezoresistive element or other sensitive elements and being connected to an evaluation and/or control circuit which is situated respectively on a circuit carrier developed as a circuit board,
   wherein the sensor housing has a first housing chamber in which the first pressure prevails, a second housing chamber in which the second pressure prevails, and a third housing chamber in which the third pressure prevails, and the first housing chamber, the second housing chamber, and the third housing chamber are separated from one another.

2. The pressure sensor as recited in claim 1, wherein the first pressure-sensor module and the second pressure-sensor module are separated from each other.

3. The pressure sensor as recited in claim 1, wherein the first pressure-sensor module is designed to measure an absolute pressure of the medium.

4. The pressure sensor as recited in claim 1, wherein the first pressure-sensor module is designed to measure the second pressure of the medium, and the first pressure-sensor module is designed to measure a first differential pressure between the first pressure and the second pressure.

5. The pressure sensor as recited in claim 1, wherein the second pressure-sensor module is designed to measure a second differential pressure between the second pressure and the third pressure.

6. The pressure sensor as recited in claim 1, wherein the first pressure-sensor module and the second pressure-sensor module are situated in two different planes parallel to each other and in a stacked shape on top of each other.

* * * * *